United States Patent [19]

Fetter

[11] 4,092,008
[45] May 30, 1978

[54] CAR SMOKERS SAFETY TRAY

[76] Inventor: Paul Edward Fetter, R.D. 1 Penn Dr. Box 394, Selinsgrove, Pa. 17870

[21] Appl. No.: 727,443

[22] Filed: Sep. 28, 1976

[51] Int. Cl.² ............................................. B60R 11/00
[52] U.S. Cl. ................................. 248/205 A; 108/45; 248/310; 248/311.1 R; 248/360
[58] Field of Search .................. 108/45, 152; 248/310, 248/311, 205 A, 223.4, DIG. 5, 359, 360, 222.1, 224.1, 224.2, 226.2, 226.4, 226.5, 311.1

[56] References Cited
U.S. PATENT DOCUMENTS

| | | | |
|---|---|---|---|
| 2,309,232 | 1/1943 | Baker et al. | 248/310 |
| 2,314,360 | 3/1943 | McEnery | 248/310 |
| 3,300,164 | 1/1967 | Welles | 248/205 A |
| 3,502,294 | 3/1970 | Kalbow et al. | 248/311.1 |
| 3,675,664 | 7/1972 | Kitowski | 248/311.1 |

Primary Examiner—Marion Parsons, Jr.
Attorney, Agent, or Firm—Diller, Brown, Ramik & Wight

[57] ABSTRACT

This disclosure is directed to an ash tray particularly adpated for utilization on the dashboard of a vehicle and includes a base and a tray having cooperative means therebetween for slidable assembly and disassembly with clamp means for releasably securing the base and tray together in the assembled condition thereof, the base including first and second end portions, the first end portion of which is formed of flexible material carrying a coating of adhesive from which can be peeled a layer of sheet material for adhering the base to the cowl of a dashboard once the first end portion of the base has been conformed to the contour of the dashboard, and the cooperative coupling means being a tongue and groove sliding connection with the base also including stabilizing tabs for reducing vibrations and laterally disposed upright walls upon which the tray rests.

9 Claims, 5 Drawing Figures

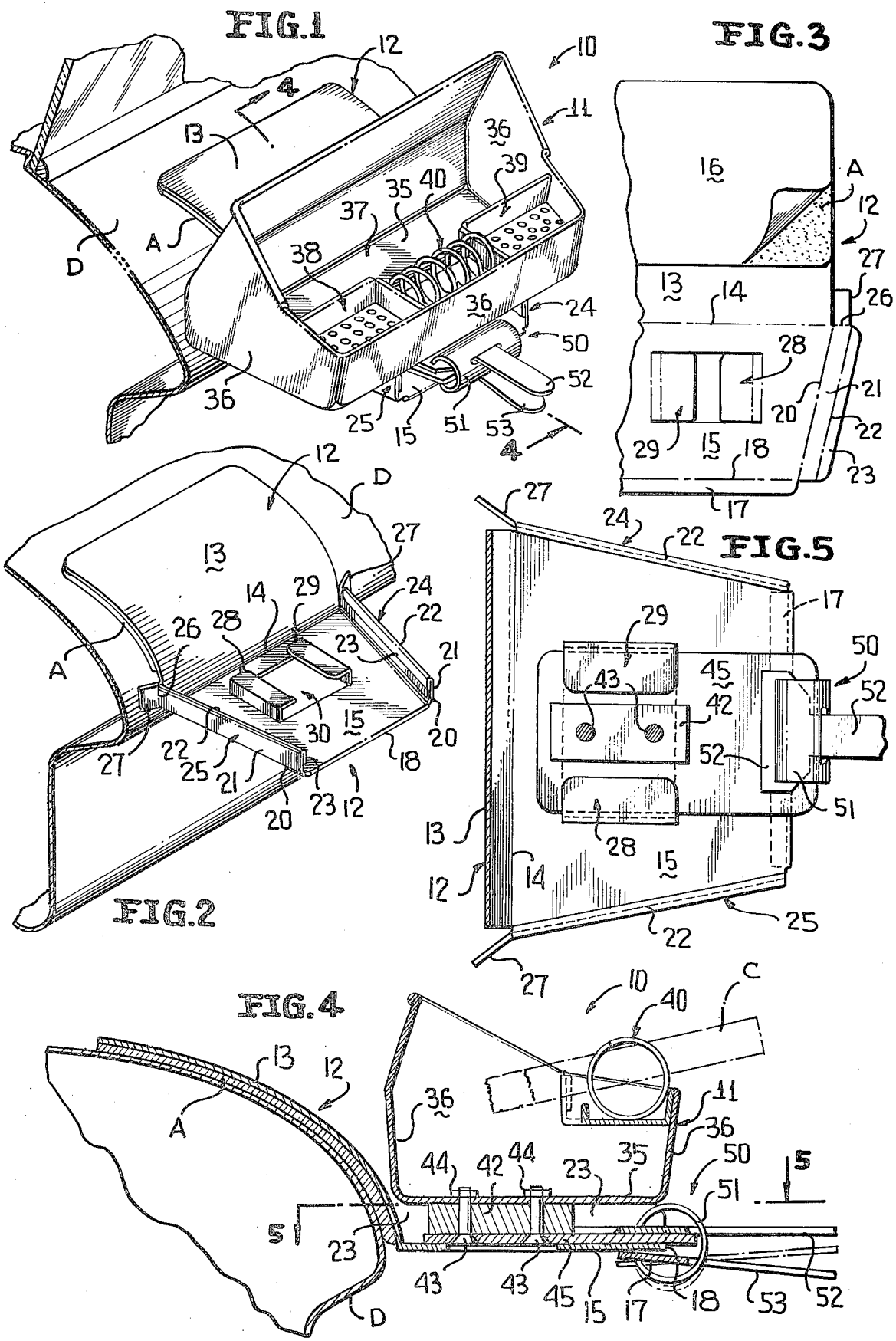

CAR SMOKERS SAFETY TRAY

The present invention is directed to an ash tray particularly adapted for utilization on the dashboard or cowl of an automobile, truck, bus or like vehicle. The ash tray is formed of a base which includes a first flexible portion which can be bent to the desired contour of the dashboard after which a sheet of backing material is removed from a coating of adhesive to adhere the base at a desired position upon the dashboard, preferably remote from side or vent windows of the automobile to prevent ashes from being blown in the vehicle interior. A second end portion of the base includes a pair of generally inverted L-shaped legs defining a generally inverted T-shaped slot which receives a T-shaped tongue of a tray in sliding relationship to permit the tray and base to be readily assembled and disassembled particularly for the purpose of emptying the tray for subsequent and repetitive uses.

In further accordance with this invention, the second end portion of the base includes a pair of laterally spaced upright walls upon which rests a bottom wall of the tray to render stability to the base and tray in the assembled condition thereof.

Yet another object of this invention is to provide a novel ash tray of the type heretofore described wherein stabilizing tabs are bendably connected to the second end portion and upon the mounting of the base to the vehicle dashboard and the assembly of the tray thereto, the tabs can be bent into supporting contact with the dashboard and thus reduce vibrations and more securely stabilize the ash tray upon the vehicle dashboard.

Still another object of this invention is to provide a novel ash tray of the type aforesaid wherein clamp means are provided for securing the base and tray in their assembled condition while readily permitting the slidable disassembly thereof.

Still another object of this invention is to provide a novel ash tray of the type heretofore defined wherein the upright walls are formed of material of the base bent upon itself to form both an upstanding wall and a downwardly directed wall, thus reinforcing and imparting rigidity to the base second end portion.

With the above and other objects in view that will hereinafter appear, the nature of the invention will be more clearly understood by reference to the following detailed description, the appended claimed subject matter, and the several views illustrated in the accompanying drawings.

In the Drawings.

FIG. 1 is a fragmentary perspective view of the novel ash tray of this invention and illustrates an assembled tray and base with the latter being adhesively secured to the cowl of an automotive or like vehicle dashboard.

FIG. 2 is a fragmentary perspective view similar to FIG. 1, and illustrates only the base portion secured to the vehicle dashboard with the tray being removed.

FIG. 3 is a fragmentary top plan view of a portion of the base, and illustrates the latter in blank form.

FIG. 4 is a cross-sectional view taken generally along line 4—4 of FIG. 1, and illustrates the manner in which the tray is secured by a spring biased clamp to the base.

FIG. 5 is a cross-sectional view taken generally along line 5—5 of FIG. 4, and illustrates in detail the sliding connection between the base and tray.

A novel ash tray which is particularly adapted for utilization on the dashboard of a vehicle is generally designated by the reference numeral 10 (FIGS. 1 and 4) and includes a tray 11 and a base 12.

The base 12 is preferably constructed from flexible metallic material and in the blank form thereof (FIG. 3) includes a generally rectangular first end portion 13 joined by a bend line or fold line 14 to a second generally trapezoidally shaped end portion 15. The first end portion 13 of the base 12 includes a coating of pressure-sensitive adhesive A on an underside (unnumbered) thereof which is covered by a peelable sheet of paper or like material 16.

The second end portion 15 includes a ledge 17 joined thereto along a fold line or bend line 18. The ledge 17 is underfolded along the bend line 18 in the manner best illustrated in FIG. 4 to reinforce the base 15 along the fold line 18.

At each lateral side of the second portion 15 of the base 12 is a fold line 20 which joins to the second end portion a wall 21 which is in turn joined by a fold line 22 to a wall 23. The wall 21 is bent along the fold line 20 to a generally vertical upright position (FIG. 2) while the wall 23 is bent downwardly along the fold line 22 to collectively define laterally spaced reinforced upright walls 24, 25.

A fold line 26 connects a stabilizing tab 27 to each of the walls 21. The purpose of the stabilizing tabs 27 is to permit the same to be bent along the fold lines 26 to contact an associated dashboard or cowl D (FIG. 2) of a vehicle when the base 12 is secured to the dashboard D in a manner to be described more fully hereinafter.

A central portion (unnumbered) of the second end portion 15 of the base 12 is blanked to define a pair of generally inverted opposing laterally spaced L-shaped legs 28, 29, (FIG. 2) which therebetween define an inverted generally T-shaped slot, channel or groove 30 as viewed in transverse cross-section. The means 28 through 30 cooperate with means to be described hereinafter associated with the tray 11 to maintain the tray 11 and the base 12 in sliding assembled relationship yet permit relative disassembly of the latter components.

The tray 11 includes a bottom wall 35 and a generally rectangularly shaped peripheral wall 36 cooperatively defining a chamber 37 which may be subdivided into additional chambers 38, 39 between which is a loosely wound spring 40 designed to receive between the coils thereof cigarettes, cigars, or like articles C (FIG. 4).

A downwardly directed block 42 of a generally rectangular shape is secured by screws 43 and nuts 44 to the bottom wall 35 of the tray 11 and to a generally rectangular plate 45. The plate 45 and the block 42 when viewed in transverse cross-section are generally of an inverted T-shaped configuration and the cross-section thereof matches the inverted T-shaped cross-section of the groove 30. Thus, the plate 45 and the block 42 can be slid into the groove 30 to assemble the tray 11 relative to the second end portion 15 of the base 12 and removed by a sliding action in an opposite direction to disassemble the tray 11 relative to the second end portion 15 of the base 12. In the assembled condition (FIGS. 1 and 4) of the tray 11 relative to the base 12, the bottom wall 35 rests upon each of the fold lines 22 of the upright walls 24, 25 of the base 12 thereby lending stability to the tray 11 as it is supported atop the upright walls 24, 25 of the second end portion 15 of the base 12.

In order to maintain the tray 11 and the base 12 in their assembled condition (FIGS. 1, 4 and 5), means in the form of a spring bias clamp 50 are provided which includes a spring 51 and a pair of arms or jaws 52, 53.

The jaw 52 is welded or otherwise secured to the rectangular plate 45 carried by the tray 11. Thus, in the assembled condition best shown in FIG. 4 the second end portion 15 of the base 12 is sandwiched between the rectangular plate 45 and the jaw 53. In the solid outline position of the jaw 53 shown in FIG. 4, the tray 10 is thus clampingly secured to the second end portion 15 of the base 12 by the spring biased clamping force of the jaw 53, as shown in solid lines. If, however, the jaw 53 is moved to the phantom outline position against the bias of the spring 51, the tray 11 can be pulled to the right, as viewed in FIG. 4, to slidably disassemble the same from the second end portion 15 of the base 12. Opposite motion, again as viewed in FIG. 4, would, of course, reassemble the tray 11 relative to the base 12.

The end portions 13, 15 of the base 12 occupy a single plane prior to the securement of the first end portion 13 of the base 12 to the dashboard D. However, since dashboards or cowls D are of varying contours, the first end portion 13 may be bent to the desired contour of the dashboard D while the sheet 16 is still applied to the adhesive A. Once the end portion 13 conforms to the dashboard D, the sheet 16 is removed and the adhesive A is placed in contact with the dashboard D, as shown in FIG. 4. Thereafter, the tabs 27 are bent as necessary to contact the dashboard D to further stabilize the base 12 relative thereto. Once the base 12 is assembled to the dashboard D as shown in FIG. 2, the tray 11 may be assembled or disassembled in the manner described.

While preferred forms and arrangement of parts have been shown in illustrating the invention, it is to be clearly understood that various changes in details and arrangement of parts may be made without departing from the scope and spirit of the disclosure.

What is claimed is:

1. An ash tray particularly adapted for utilization on the dashboard of a vehicle comprising a base and a tray, said tray including a bottom wall and an upstanding peripheral wall collectively defining a chamber adapted to receive ashes and like debris, said base having first and second end portions, means for securing said first end portion to a vehicle dashboard with said second end portion projecting therefrom and forming a seat for said tray, cooperative means carried by said second end portion and bottom wall for slidably assembling and disassembling said base and tray, said tray having a forward projection overlying a forward edge of said second end portion, and clamp means at the forward edge of said second end portion for releasably securing said projection to said second end portion in the assembled condition of said ash tray.

2. The ash tray as defined in claim 1 wherein said cooperative means includes channel means carried by one of said second end portions and bottom wall and tongue means carried by the other of said second end portion and bottom wall.

3. The ash tray as defined in claim 1 wherein said clamp means is a spring biased clamp having a pair of jaws, and at least said second end portion is clampingly disposed between said jaws in the assembled condition of said base and tray.

4. The ash tray as defined in claim 1 wherein said cooperative means includes channel means carried by said second end portion and tongue means carried by said bottom wall.

5. An ash tray particularly adapted for utilization on the dashboard of a vehicle comprising a base and a tray, said tray including a bottom wall and an upstanding peripheral wall collectively defining a chamber adapted to receive ashes and like debris, said base having first and second end portions, means for securing said first end portion to a vehicle dashboard, cooperative means carried by said second end portion and bottom wall for slidably assembling and disassembling said base and tray, and clamp means for releasably securing said base and tray together in the assembled condition thereof, said second end portion including a pair of spaced lateral upright walls, and said bottom wall resting upon said spaced lateral upright walls.

6. The ash tray as defined in claim 5 wherein each of said upright walls is defined by a first upwardly directed wall joined along a first fold line to said second end portion and a second downwardly directed wall joined along a second fold line to said first upwardly directed wall, and said bottom wall rests upon said second fold lines of said upright walls.

7. The ash tray as defined in claim 5 wherein said first end portion is constructed of flexible material and can thereby be bent into conformity with the contour of an associated vehicle dashboard, said cooperative means includes channel means carried by one of said second end portion and bottom wall and tongue means carried by the other of said second end portion and bottom wall, said securing means includes a pressure sensitive adhesive, removable means covering said adhesive and being adapted to be peeled therefrom incident to securing said first end portion to a vehicle dashboard, said clamp means is a spring biased clamp having a pair of jaws, at least said second end portion being clampingly disposed between said jaws in the assembled condition of said base and tray, each of said upright walls being defined by a first upwardly directed wall joined along a first fold line to said second end portion and a secondly downwardly directed wall joined along a second fold line to said first upwardly directed wall, said channel means is defined by a pair of spaced legs of a generally opposed L-shaped configuration defining a T-shaped slot therebetween, and generally T-shaped tongue means carried by said bottom wall for sliding reception in said T-shaped slot.

8. The ash tray as defined in claim 7 including a pair of laterally spaced tabs carried by said second end portion, said tabs project in a direction toward said first end portion, and each tab being joined to said second end portion by a bend line along which the tabs may be bent to bring the same into contact with an associated vehicle dashboard to minimize in-use vibrations.

9. An ash tray particularly adapted for utilization on the dashboard of a vehicle comprising a base and a tray, said tray including a bottom wall and an upstanding peripheral wall collectively defining a chamber adapted to receive ashes and like debris, said base having first and second end portions, means for securing said first end portion to a vehicle dashboard, cooperative means carried by said second end portion and bottom wall for slidably assembling and disassembling said base and tray, and clamp means for releasably securing said base and tray together in the assembled condition thereof, a pair of laterally spaced tabs being carried by said second end portion, said tabs projecting in a direction toward said first end portion, and each tab being joined to said second end portion by a bend line along which the tabs may be bent to bring the same into the contact with an associated vehicle dashboard to minimize in-use vibrations.

* * * * *